United States Patent [19]

Lipman

[11] Patent Number: 5,224,028
[45] Date of Patent: Jun. 29, 1993

[54] METHOD FOR DEFINING PULSE WIDTH MODULATION (PWM) WAVEFORM PATTERNS TO PRODUCE INVERTER OUTPUTS HAVING A LOW HARMONIC CONTENT

[75] Inventor: Kenneth Lipman, West Hartford, Conn.

[73] Assignee: International Fuel Cells, Inc., South Windsor, Conn.

[21] Appl. No.: 773,114

[22] Filed: Oct. 4, 1991

[51] Int. Cl.⁵ .............................................. H02M 1/12
[52] U.S. Cl. .................................... 363/41; 323/207; 363/98
[58] Field of Search .................... 363/41, 42, 37, 97, 363/98; 323/207

[56] References Cited

U.S. PATENT DOCUMENTS

| | | | |
|---|---|---|---|
| 3,614,590 | 10/1971 | Kernick | 363/41 |
| 4,808,903 | 2/1989 | Matsui et al. | 318/800 |
| 4,954,726 | 4/1990 | Lipman et al. | 307/46 |
| 4,977,492 | 12/1990 | Kirchberg, Jr. et al. | 363/41 |

Primary Examiner—Steven L. Stephan
Assistant Examiner—Ben M. Davidson
Attorney, Agent, or Firm—McCormick, Paulding & Huber

[57] ABSTRACT

A method for defining a pulse width modulation (PWM) waveform pattern to control the switching bridges in a power inverter system to produce a low harmonic content output voltage signal includes assigning a waiting factor to each harmonic produced by the switching bridges in the power inverter system. Harmonics reduced by the power inverter system are identified and other harmonics are selected to be reduced. The selected harmonics are represented one-for-one by a corresponding set of equations and the equations are solved by each of the switch points in the PWM waveform pattern. A program for finding the switch points is also presented.

4 Claims, 6 Drawing Sheets

ANGLES IN DEGREES

| PAT | SW | FUND. | 1 | 2 | 3 | 4 | 5 | 6 |
|---|---|---|---|---|---|---|---|---|
| 2 | 10 | 0.50941 | 3.561 | 5.506 | 18.374 | 22.603 | 24.138 | 30.329 |
| 2 | 10 | 0.51002 | 3.546 | 5.492 | 18.377 | 22.598 | 24.131 | 30.324 |
| 2 | 10 | 0.51033 | 3.530 | 5.477 | 18.381 | 22.594 | 24.125 | 30.321 |
| 2 | 10 | 0.51099 | 3.515 | 5.464 | 18.385 | 22.592 | 24.123 | 30.321 |
| 2 | 10 | 0.51143 | 3.500 | 5.449 | 18.389 | 22.591 | 24.121 | 30.324 |
| 2 | 10 | 0.51177 | 3.483 | 5.434 | 18.394 | 22.593 | 24.122 | 30.330 |
| 2 | 10 | 0.51245 | 3.469 | 5.421 | 18.398 | 22.596 | 24.125 | 30.337 |
| 2 | 10 | 0.51291 | 3.453 | 5.408 | 18.403 | 22.601 | 24.129 | 30.347 |
| 2 | 10 | 0.51328 | 3.436 | 5.393 | 18.409 | 22.609 | 24.136 | 30.360 |
| 2 | 10 | 0.51399 | 3.422 | 5.381 | 18.414 | 22.616 | 24.144 | 30.373 |
| 2 | 10 | 0.51451 | 3.407 | 5.368 | 18.420 | 22.626 | 24.153 | 30.389 |
| 2 | 10 | 0.51504 | 3.391 | 5.356 | 18.426 | 22.638 | 24.165 | 30.407 |
| 2 | 10 | 0.51558 | 3.376 | 5.343 | 18.433 | 22.650 | 24.178 | 30.426 |
| 2 | 10 | 0.51612 | 3.361 | 5.331 | 18.439 | 22.665 | 24.192 | 30.446 |
| 2 | 10 | 0.51667 | 3.347 | 5.320 | 18.446 | 22.680 | 24.208 | 30.468 |
| 2 | 10 | 0.51722 | 3.332 | 5.309 | 18.453 | 22.697 | 24.225 | 30.492 |
| 2 | 10 | 0.51776 | 3.317 | 5.297 | 18.460 | 22.715 | 24.244 | 30.517 |
| 2 | 10 | 0.51820 | 3.303 | 5.286 | 18.467 | 22.735 | 24.265 | 30.544 |
| 2 | 10 | 0.51897 | 3.290 | 5.277 | 18.474 | 22.753 | 24.285 | 30.569 |
| 2 | 10 | 0.51954 | 3.276 | 5.267 | 18.482 | 22.775 | 24.308 | 30.598 |
| 2 | 10 | 0.52002 | 3.262 | 5.257 | 18.490 | 22.799 | 24.334 | 30.629 |
| 2 | 10 | 0.52081 | 3.250 | 5.248 | 18.497 | 22.821 | 24.358 | 30.658 |
| 2 | 10 | 0.52134 | 3.236 | 5.239 | 18.506 | 22.847 | 24.386 | 30.692 |
| 2 | 10 | 0.52217 | 3.225 | 5.232 | 18.513 | 22.871 | 24.413 | 30.724 |
| 2 | 10 | 0.52275 | 3.212 | 5.223 | 18.522 | 22.900 | 24.445 | 30.762 |
| 2 | 10 | 0.52364 | 3.201 | 5.217 | 18.530 | 22.926 | 24.475 | 30.796 |
| 2 | 10 | 0.52432 | 3.189 | 5.210 | 18.540 | 22.958 | 24.512 | 30.838 |
| 2 | 10 | 0.52530 | 3.178 | 5.204 | 18.548 | 22.968 | 24.547 | 30.876 |
| 2 | 10 | 0.52611 | 3.167 | 5.199 | 18.558 | 23.024 | 24.589 | 30.924 |
| 2 | 10 | 0.52722 | 3.158 | 5.195 | 18.568 | 23.057 | 24.629 | 30.968 |
| 2 | 10 | 0.52821 | 3.148 | 5.191 | 18.579 | 23.100 | 24.681 | 31.024 |
| 2 | 10 | 0.52949 | 3.139 | 5.190 | 18.591 | 23.142 | 24.734 | 31.080 |
| 2 | 10 | 0.53098 | 3.133 | 5.190 | 18.603 | 23.188 | 24.793 | 31.142 |
| 2 | 10 | 0.53272 | 3.128 | 5.194 | 18.616 | 23.238 | 24.859 | 31.209 |
| 2 | 10 | 0.53482 | 3.127 | 5.202 | 18.630 | 23.293 | 24.935 | 31.284 |
| 2 | 10 | 0.53739 | 3.131 | 5.216 | 18.644 | 23.351 | 25.020 | 31.364 |
| 2 | 10 | 0.54057 | 3.143 | 5.239 | 18.659 | 23.410 | 25.114 | 31.446 |
| 2 | 10 | 0.54446 | 3.163 | 5.272 | 18.673 | 23.465 | 25.213 | 31.521 |
| 2 | 10 | 0.54906 | 3.192 | 5.312 | 18.681 | 23.507 | 25.304 | 31.576 |
| 2 | 10 | 0.55403 | 3.216 | 5.344 | 18.676 | 23.522 | 25.364 | 31.595 |
| 2 | 10 | 0.55787 | 3.252 | 5.392 | 18.695 | 23.550 | 25.431 | 31.622 |
| 2 | 10 | 0.56305 | 3.301 | 5.457 | 18.707 | 23.570 | 25.510 | 31.632 |
| 2 | 10 | 0.56968 | 3.371 | 5.547 | 18.716 | 23.571 | 25.595 | 31.604 |
| 2 | 10 | 0.57605 | 3.434 | 5.628 | 18.719 | 23.555 | 25.651 | 31.547 |
| 2 | 10 | 0.58360 | 3.513 | 5.731 | 18.717 | 23.515 | 25.701 | 31.439 |
| 2 | 10 | 0.59046 | 3.580 | 5.819 | 18.713 | 23.466 | 25.725 | 31.320 |
| 2 | 10 | 0.59772 | 3.651 | 5.914 | 18.705 | 23.399 | 25.735 | 31.166 |
| 2 | 10 | 0.60520 | 3.723 | 6.011 | 18.692 | 23.316 | 25.727 | 30.982 |
| 2 | 10 | 0.61283 | 3.794 | 6.110 | 18.675 | 23.217 | 25.700 | 30.772 |
| 2 | 10 | 0.62056 | 3.864 | 6.209 | 18.653 | 23.102 | 25.652 | 30.539 |
| 2 | 10 | 0.62836 | 3.932 | 6.307 | 18.626 | 22.973 | 25.585 | 30.287 |
| 2 | 10 | 0.63623 | 3.998 | 6.405 | 18.593 | 22.829 | 25.497 | 30.021 |
| 2 | 10 | 0.64415 | 4.061 | 6.501 | 18.554 | 22.671 | 25.389 | 29.745 |
| 2 | 10 | 0.65213 | 4.122 | 6.596 | 18.508 | 22.498 | 25.263 | 29.464 |
| 2 | 10 | 0.66016 | 4.180 | 6.689 | 18.454 | 22.312 | 25.120 | 29.181 |
| 2 | 10 | 0.66823 | 4.236 | 6.781 | 18.393 | 22.114 | 24.964 | 28.901 |
| 2 | 10 | 0.67635 | 4.288 | 6.871 | 18.323 | 21.905 | 24.797 | 28.628 |
| 2 | 10 | 0.68450 | 4.338 | 6.958 | 18.244 | 21.686 | 24.624 | 28.363 |
| 2 | 10 | 0.69268 | 4.385 | 7.043 | 18.157 | 21.460 | 24.448 | 28.109 |
| 2 | 10 | 0.70088 | 4.428 | 7.126 | 18.060 | 21.227 | 24.272 | 27.866 |
| 2 | 10 | 0.70909 | 4.468 | 7.206 | 17.954 | 20.990 | 24.100 | 27.636 |
| 2 | 10 | 0.71732 | 4.505 | 7.283 | 17.840 | 20.750 | 23.934 | 27.417 |

PATTERN NO. 2
10 SWITCH POINTS

| FIG. 3A | FIG. 3B |

FIG. 3A

|   7    |   8    |   9    |  10    |
|--------|--------|--------|--------|
| 31.029 | 45.865 | 49.389 | 49.900 |
| 31.031 | 45.851 | 49.291 | 49.800 |
| 31.038 | 45.834 | 49.179 | 49.700 |
| 31.046 | 45.820 | 49.082 | 49.600 |
| 31.058 | 45.803 | 48.975 | 49.500 |
| 31.073 | 45.784 | 48.861 | 49.400 |
| 31.088 | 45.768 | 48.762 | 49.300 |
| 31.106 | 45.749 | 48.653 | 49.200 |
| 31.128 | 45.728 | 48.537 | 49.100 |
| 31.149 | 45.710 | 48.437 | 49.000 |
| 31.173 | 45.688 | 48.327 | 48.900 |
| 31.199 | 45.666 | 48.215 | 48.800 |
| 31.226 | 45.642 | 48.103 | 48.700 |
| 31.255 | 45.618 | 47.989 | 48.600 |
| 31.286 | 45.591 | 47.874 | 48.500 |
| 31.317 | 45.563 | 47.757 | 48.400 |
| 31.351 | 45.533 | 47.637 | 48.300 |
| 31.387 | 45.499 | 47.508 | 48.200 |
| 31.420 | 45.467 | 47.396 | 48.100 |
| 31.458 | 45.429 | 47.269 | 48.000 |
| 31.499 | 45.386 | 47.131 | 47.900 |
| 31.536 | 45.345 | 47.009 | 47.800 |
| 31.581 | 45.293 | 46.864 | 47.700 |
| 31.621 | 45.243 | 46.734 | 47.600 |
| 31.669 | 45.179 | 46.578 | 47.500 |
| 31.714 | 45.117 | 46.436 | 47.400 |
| 31.768 | 45.036 | 46.265 | 47.300 |
| 31.817 | 44.956 | 46.108 | 47.200 |
| 31.878 | 44.850 | 45.913 | 47.100 |
| 31.936 | 44.743 | 45.731 | 47.000 |
| 32.009 | 44.596 | 45.497 | 46.900 |
| 32.083 | 44.434 | 45.261 | 46.800 |
| 32.166 | 44.240 | 44.995 | 46.700 |
| 32.259 | 44.006 | 44.695 | 46.600 |
| 32.364 | 43.721 | 44.350 | 46.500 |
| 32.482 | 43.375 | 43.955 | 46.400 |
| 32.612 | 42.964 | 43.508 | 46.300 |
| 32.745 | 42.495 | 43.020 | 46.200 |
| 32.867 | 42.003 | 42.532 | 46.100 |
| 32.950 | 41.573 | 42.134 | 46.000 |
| 33.019 | 41.323 | 41.878 | 45.900 |
| 33.100 | 40.899 | 41.474 | 45.800 |
| 33.170 | 40.349 | 40.979 | 45.700 |
| 33.198 | 39.904 | 40.598 | 45.600 |
| 33.192 | 39.395 | 40.190 | 45.500 |
| 33.155 | 39.002 | 39.896 | 45.400 |
| 33.084 | 38.611 | 39.627 | 45.300 |
| 32.982 | 38.240 | 39.397 | 45.200 |
| 32.852 | 37.892 | 39.207 | 45.100 |
| 32.701 | 37.570 | 39.056 | 45.000 |
| 32.535 | 37.272 | 38.941 | 44.900 |
| 32.362 | 36.998 | 38.858 | 44.800 |
| 32.187 | 36.747 | 38.802 | 44.700 |
| 32.018 | 36.515 | 38.771 | 44.600 |
| 31.859 | 36.303 | 38.759 | 44.500 |
| 31.714 | 36.106 | 38.764 | 44.400 |
| 31.585 | 35.924 | 38.784 | 44.300 |
| 31.473 | 35.755 | 38.814 | 44.200 |
| 31.379 | 35.597 | 38.855 | 44.100 |
| 31.301 | 35.448 | 38.903 | 44.000 |
| 31.238 | 35.306 | 38.957 | 43.900 |
| 31.188 | 35.171 | 39.016 | 43.800 |

FIG. 3B

ANGLES IN DEGREES

| PAT | SW | FUND. | 1 | 2 | 3 | 4 | 5 | 6 |
|---|---|---|---|---|---|---|---|---|
| 5 | 10 | 0.49996 | 3.392 | 8.476 | 10.236 | 32.192 | 33.146 | 37.827 |
| 5 | 10 | 0.50280 | 3.430 | 8.468 | 10.244 | 31.844 | 32.778 | 37.675 |
| 5 | 10 | 0.50665 | 3.475 | 8.452 | 10.250 | 31.443 | 32.372 | 37.516 |
| 5 | 10 | 0.51012 | 3.518 | 8.429 | 10.254 | 31.075 | 32.016 | 37.377 |
| 5 | 10 | 0.51321 | 3.548 | 8.407 | 10.254 | 30.814 | 31.771 | 37.276 |
| 5 | 10 | 0.51630 | 3.580 | 8.378 | 10.253 | 30.537 | 31.519 | 37.162 |
| 5 | 10 | 0.52012 | 3.612 | 8.340 | 10.250 | 30.254 | 31.268 | 37.032 |
| 5 | 10 | 0.52307 | 3.636 | 8.303 | 10.246 | 30.020 | 31.063 | 36.907 |
| 5 | 10 | 0.52636 | 3.656 | 8.263 | 10.240 | 29.796 | 30.869 | 36.769 |
| 5 | 10 | 0.53011 | 3.675 | 8.206 | 10.231 | 29.521 | 30.628 | 36.566 |
| 5 | 10 | 0.53316 | 3.685 | 8.157 | 10.223 | 29.299 | 30.431 | 36.374 |
| 5 | 10 | 0.53590 | 3.690 | 8.103 | 10.214 | 29.069 | 30.221 | 36.146 |
| 5 | 10 | 0.54009 | 3.688 | 8.023 | 10.203 | 28.723 | 29.895 | 35.770 |
| 5 | 10 | 0.54330 | 3.680 | 7.959 | 10.198 | 28.436 | 29.615 | 35.435 |
| 5 | 10 | 0.54610 | 3.669 | 7.904 | 10.196 | 28.172 | 29.355 | 35.124 |
| 5 | 10 | 0.55019 | 3.649 | 7.826 | 10.203 | 27.760 | 28.943 | 34.646 |
| 5 | 10 | 0.55310 | 3.635 | 7.780 | 10.214 | 27.477 | 28.660 | 34.330 |
| 5 | 10 | 0.55616 | 3.621 | 7.737 | 10.231 | 27.180 | 28.365 | 34.008 |
| 5 | 10 | 0.56015 | 3.604 | 7.693 | 10.262 | 26.800 | 27.989 | 33.604 |
| 5 | 10 | 0.56326 | 3.595 | 7.668 | 10.293 | 26.508 | 27.701 | 33.293 |
| 5 | 10 | 0.56624 | 3.589 | 7.652 | 10.327 | 26.240 | 27.437 | 33.002 |
| 5 | 10 | 0.57050 | 3.586 | 7.643 | 10.384 | 25.857 | 27.055 | 32.567 |
| 5 | 10 | 0.57316 | 3.589 | 7.646 | 10.427 | 25.603 | 26.799 | 32.263 |
| 5 | 10 | 0.57616 | 3.597 | 7.659 | 10.484 | 25.282 | 26.469 | 31.863 |
| 5 | 10 | 0.58075 | 3.618 | 7.693 | 10.572 | 24.820 | 25.987 | 31.277 |
| 5 | 10 | 0.58365 | 3.637 | 7.723 | 10.633 | 24.508 | 25.658 | 30.889 |
| 5 | 10 | 0.58599 | 3.655 | 7.752 | 10.685 | 24.245 | 25.380 | 30.577 |
| 5 | 10 | 0.58724 | 3.664 | 7.767 | 10.710 | 24.119 | 25.247 | 30.433 |
| 5 | 10 | 0.59026 | 3.688 | 7.807 | 10.778 | 23.787 | 24.901 | 30.074 |
| 5 | 10 | 0.59353 | 3.713 | 7.847 | 10.844 | 23.473 | 24.579 | 29.763 |
| 5 | 10 | 0.60013 | 3.766 | 7.930 | 10.982 | 22.861 | 23.974 | 29.222 |
| 5 | 10 | 0.60327 | 3.791 | 7.969 | 11.048 | 22.587 | 23.717 | 29.005 |
| 5 | 10 | 0.60595 | 3.810 | 7.998 | 11.098 | 22.393 | 23.539 | 28.858 |
| 5 | 10 | 0.60865 | 3.827 | 8.024 | 11.146 | 22.213 | 23.379 | 28.726 |
| 5 | 10 | 0.61262 | 3.855 | 8.065 | 11.221 | 21.945 | 23.151 | 28.536 |
| 5 | 10 | 0.61589 | 3.875 | 8.093 | 11.277 | 21.761 | 23.000 | 28.408 |
| 5 | 10 | 0.61919 | 3.894 | 8.119 | 11.331 | 21.591 | 22.867 | 28.292 |
| 5 | 10 | 0.62244 | 3.911 | 8.143 | 11.382 | 21.438 | 22.752 | 28.188 |
| 5 | 10 | 0.62715 | 3.938 | 8.177 | 11.460 | 21.218 | 22.595 | 28.040 |
| 5 | 10 | 0.63088 | 3.957 | 8.200 | 11.515 | 21.069 | 22.496 | 27.939 |
| 5 | 10 | 0.63457 | 3.974 | 8.221 | 11.569 | 20.933 | 22.411 | 27.847 |
| 5 | 10 | 0.63815 | 3.991 | 8.240 | 11.619 | 20.811 | 22.338 | 27.763 |
| 5 | 10 | 0.64333 | 4.015 | 8.266 | 11.694 | 20.634 | 22.240 | 27.640 |
| 5 | 10 | 0.64738 | 4.032 | 8.284 | 11.749 | 20.512 | 22.180 | 27.555 |
| 5 | 10 | 0.65141 | 4.048 | 8.299 | 11.801 | 20.399 | 22.127 | 27.475 |
| 5 | 10 | 0.65536 | 4.064 | 8.313 | 11.851 | 20.294 | 22.082 | 27.400 |
| 5 | 10 | 0.65917 | 4.078 | 8.326 | 11.897 | 20.199 | 22.045 | 27.331 |
| 5 | 10 | 0.66470 | 4.099 | 8.342 | 11.968 | 20.058 | 21.995 | 27.227 |
| 5 | 10 | 0.66901 | 4.114 | 8.353 | 12.020 | 19.959 | 21.964 | 27.153 |
| 5 | 10 | 0.67335 | 4.129 | 8.363 | 12.070 | 19.863 | 21.938 | 27.080 |
| 5 | 10 | 0.67769 | 4.143 | 8.371 | 12.119 | 19.771 | 21.916 | 27.009 |
| 5 | 10 | 0.68205 | 4.157 | 8.378 | 12.168 | 19.682 | 21.897 | 26.940 |
| 5 | 10 | 0.68642 | 4.171 | 8.384 | 12.216 | 19.596 | 21.882 | 26.872 |
| 5 | 10 | 0.69080 | 4.184 | 8.389 | 12.262 | 19.512 | 21.869 | 26.806 |
| 5 | 10 | 0.69518 | 4.197 | 8.393 | 12.308 | 19.431 | 21.859 | 26.740 |
| 5 | 10 | 0.69956 | 4.209 | 8.396 | 12.353 | 19.352 | 21.851 | 26.676 |
| 5 | 10 | 0.70395 | 4.221 | 8.398 | 12.397 | 19.274 | 21.846 | 26.612 |
| 5 | 10 | 0.70833 | 4.232 | 8.399 | 12.440 | 19.198 | 21.842 | 26.549 |
| 5 | 10 | 0.71272 | 4.244 | 8.399 | 12.482 | 19.124 | 21.840 | 26.487 |
| 5 | 10 | 0.71710 | 4.254 | 8.399 | 12.524 | 19.051 | 21.839 | 26.426 |

PATTERN NO. 5
10 SWITCH POINTS

| 7 | 8 | 9 | 10 |
|---|---|---|---|
| 40.485 | 43.896 | 49.392 | 50.563 |
| 40.333 | 43.783 | 49.217 | 50.365 |
| 40.161 | 43.647 | 48.991 | 50.101 |
| 39.998 | 43.511 | 48.748 | 49.837 |
| 39.871 | 43.403 | 48.544 | 49.606 |
| 39.722 | 43.273 | 48.291 | 49.342 |
| 39.544 | 43.120 | 47.983 | 49.012 |
| 39.370 | 42.972 | 47.683 | 48.715 |
| 39.177 | 42.811 | 47.357 | 48.385 |
| 38.897 | 42.584 | 46.904 | 47.956 |
| 38.638 | 42.381 | 46.512 | 47.593 |
| 38.343 | 42.157 | 46.094 | 47.230 |
| 37.872 | 41.810 | 45.477 | 46.702 |
| 37.476 | 41.528 | 44.994 | 46.306 |
| 37.126 | 41.280 | 44.579 | 45.976 |
| 36.612 | 40.908 | 43.968 | 45.514 |
| 36.286 | 40.657 | 43.564 | 45.217 |
| 35.962 | 40.387 | 43.141 | 44.920 |
| 35.558 | 40.011 | 42.585 | 44.557 |
| 35.247 | 39.689 | 42.143 | 44.293 |
| 34.950 | 39.363 | 41.730 | 44.062 |
| 34.495 | 38.850 | 41.142 | 43.765 |
| 34.171 | 38.492 | 40.771 | 43.600 |
| 33.742 | 38.043 | 40.343 | 43.435 |
| 33.124 | 37.459 | 39.842 | 43.237 |
| 32.728 | 37.123 | 39.578 | 43.138 |
| 32.419 | 36.876 | 39.396 | 43.072 |
| 32.281 | 36.770 | 39.320 | 43.039 |
| 31.947 | 36.520 | 39.151 | 42.973 |
| 31.670 | 36.317 | 39.023 | 42.907 |
| 31.223 | 35.987 | 38.838 | 42.808 |
| 31.059 | 35.858 | 38.775 | 42.775 |
| 30.953 | 35.772 | 38.738 | 42.742 |
| 30.863 | 35.693 | 38.707 | 42.709 |
| 30.741 | 35.580 | 38.667 | 42.676 |
| 30.666 | 35.502 | 38.645 | 42.643 |
| 30.602 | 35.431 | 38.628 | 42.610 |
| 30.549 | 35.366 | 38.614 | 42.577 |
| 30.481 | 35.271 | 38.599 | 42.544 |
| 30.439 | 35.206 | 38.592 | 42.511 |
| 30.405 | 35.145 | 38.588 | 42.478 |
| 30.377 | 35.088 | 38.586 | 42.445 |
| 30.342 | 35.004 | 38.586 | 42.412 |
| 30.321 | 34.945 | 38.588 | 42.379 |
| 30.305 | 34.888 | 38.592 | 42.346 |
| 30.291 | 34.834 | 38.597 | 42.313 |
| 30.281 | 34.784 | 38.603 | 42.280 |
| 30.270 | 34.707 | 38.614 | 42.247 |
| 30.264 | 34.652 | 38.624 | 42.214 |
| 30.261 | 34.597 | 38.635 | 42.181 |
| 30.260 | 34.543 | 38.646 | 42.148 |
| 30.260 | 34.490 | 38.659 | 42.115 |
| 30.262 | 34.437 | 38.672 | 42.082 |
| 30.265 | 34.385 | 38.686 | 42.049 |
| 30.270 | 34.333 | 38.700 | 42.016 |
| 30.275 | 34.282 | 38.715 | 41.983 |
| 30.282 | 34.231 | 38.730 | 41.950 |
| 30.289 | 34.181 | 38.746 | 41.917 |
| 30.298 | 34.131 | 38.762 | 41.884 |
| 30.307 | 34.081 | 38.778 | 41.851 |

FIG. 4B

METHOD FOR DEFINING PULSE WIDTH MODULATION (PWM) WAVEFORM PATTERNS TO PRODUCE INVERTER OUTPUTS HAVING A LOW HARMONIC CONTENT

BACKGROUND OF THE INVENTION

The present invention relates generally to power conversion systems and deals more specifically with a method for selecting pulse width modulation waveform patterns using weighted factors to control a multiple bridge power inverter to produce a multiple phase AC voltage output signal having low harmonic signal content.

The problem of producing harmonic free AC output power from a power inverter exists for any known means of generation. It is also known that harmonics in the AC output power are generally more severe when the input to the power inverter is from a switched DC voltage source. The use of high power semiconductor inverters has fostered a number of different approaches to reduce harmonics in the AC voltage output; however, these approaches have generally not been satisfactory. The use of passive filters to reduce harmonics is limited due to losses, cost and unsatisfactory dynamic performance.

Although not completely satisfactory, two methods for reducing harmonics in inverter output voltages have been used with some degree of success. One method of harmonic reduction utilizes combinations of phase displaced, three-phase bridges and reference may be made to U.S. Pat. No. 4,975,822 assigned to the same assignee as the present invention and which disclosure is incorporated herein by reference.

A second known method to achieve harmonic reduction includes exciting the power inverter utilizing a pulse width modulated control signal. The improvement in semiconductor switching devices to handle high power levels has permitted the design of power inverters to produce several hundred kilowatts and pulse width modulation techniques have been used to remove a substantial portion of the unwanted harmonics in the power inverter bridge output voltage signal.

It is not easy to define a given pulse width modulated waveform signal which has the desired harmonic reduction because the waveforms are expressed either as a Fourier series of sine and cosine terms or Bessel functions. One commonly known method to define a pulse width modulated waveform uses the sine-triangle method to generate gating signals to control the semiconductor switching. One problem generally associated with the sine-triangle method is that the peak of the sinewave cannot reach the apex of the triangle and the modulation index over the full switching range approximates 80% whereas a high as possible modulation index is desired.

Also, the sine-triangle method generally results in an inverter output voltage signal having a very high magnitude 11th and 13th harmonic. The high harmonics often lead to high overcurrents which trip the circuit breakers associated with each output and also contributes to a "noisy" output voltage signal.

Another factor to be considered in obtaining a suitable PWM waveform pattern is that harmonics which are reduced at one frequency generally always result in increasing other harmonics at different frequencies. Additional problems generally associated with pulse width modulation techniques for reducing harmonics is that each switch pair added to the PWM waveform pattern reduces the available voltage from the inverter.

There are also several practical considerations that limit the use of the pulse width modulation PWM techniques for reduction of harmonic signals and include among them: dwell time when both switch base drives must be in an off-state to compensate for the semiconductor device turnoff delay; limitations in the minimum pulse width obtainable due to the control design and upper frequency limits of the switch devices used. Although PWM techniques have made possible some improvements in the reduction of harmonics, the reductions are not always predictable and the same harmonics are often cancelled more than once.

It is a general aim of the present invention therefore to provide a method to design a set of pulse width modulation (PWM) waveform patterns that reduce only those harmonics necessary for a particular design and which harmonics are not removed by other portions of the power inverter system. Accordingly, the method of the present invention permits the selection of PWM waveform patterns that eliminate or otherwise minimize the undesired harmonics to an acceptable magnitude.

SUMMARY OF THE INVENTION

In accordance with the present invention, a method for defining a pulse width modulation (PWM) waveform pattern to control at least one switching bridge in a power inverter system to produce a low harmonic content output voltage signal wherein the PWM waveform pattern has at least one switching point includes the steps of specifying a desired harmonic signal content in a voltage output for the power inverter system for each of the harmonics produced by the switching bridge; defining the pulse switching rate for the switching bridge; assigning a weighting factor to each harmonic produced by the switching bridge in the power inverter system; identifying each harmonic reduced by the power inverter system and selecting harmonics, other than those harmonics reduced by the power inverter system, to be reduced; representing the selected harmonics to be reduced on a one-for-one basis by a corresponding set of equations and solving the set of equations to find each of the switch points in the PWM waveform pattern.

BRIEF DESCRIPTION OF THE DRAWINGS

FIG. 3a and FIG. 3b show a table of solutions for ten switch points for one PWM waveform pattern in accordance with the method of the present invention.

FIG. 4a and FIG. 4b show another table of solutions for ten switch points for a PWM waveform pattern in accordance with the method of the present invention.

DETAILED DESCRIPTION OF THE PREFERRED EMBODIMENTS

Figure 1:
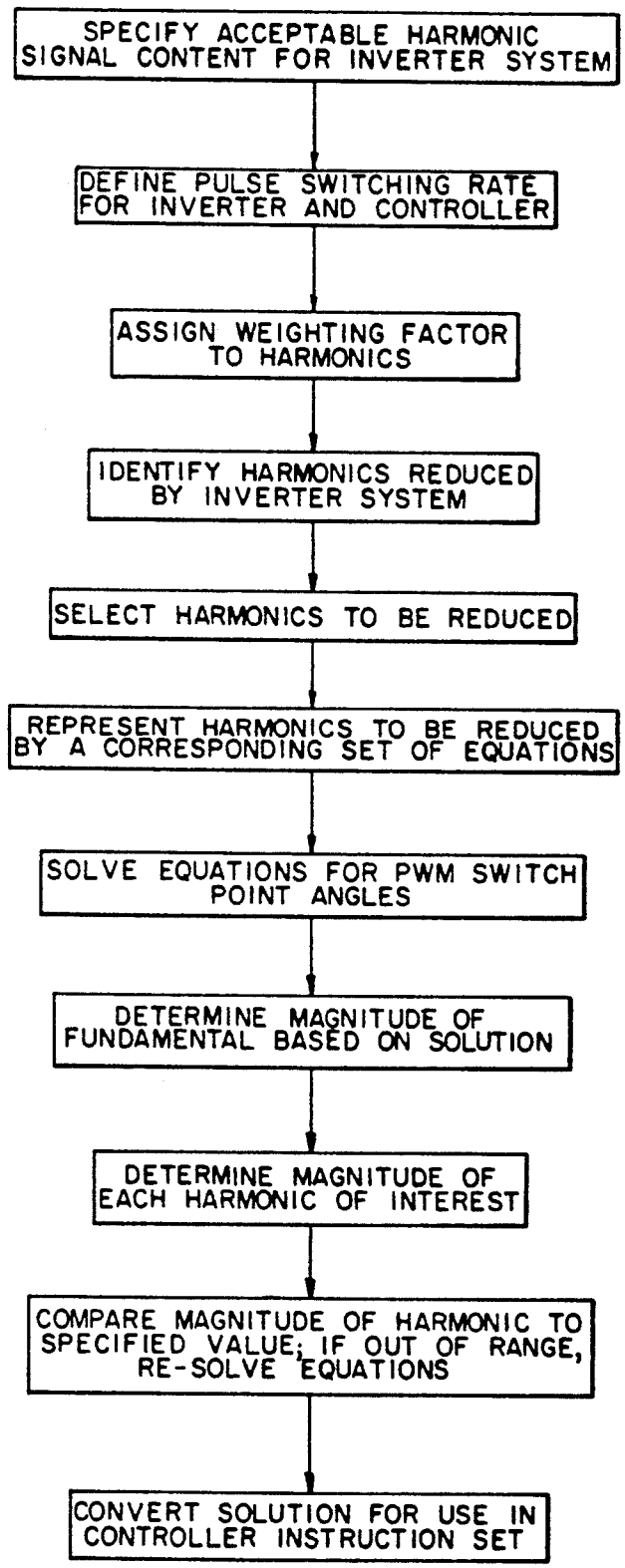
FIG. 1 is a flowchart showing the general steps embodied in the method of the present invention.

Prior to considering the method of the present invention in detail, it is beneficial for a better understanding of the invention to consider the following information.

If the voltage output signal of an unmodulated three-phase bridge is examined, it would be seen that the inverter develops an output line-to-line voltage signal having only odd harmonics and those harmonics that are produced are not integral multiples of three (triplens). With the application of the simplest PWM control waveform pattern comprising an edge or center notch pulses for example, voltage control of the fundamental is obtained at the expense of producing increased higher order harmonics. Additional pulses may be added to the pattern to decrease some of the additional harmonics created however other harmonics will be increased. To applicant's knowledge, there is no direct method or procedure to decide which harmonics are reduced, which harmonics are increased and which harmonics are ignored due to the additional pulses added to the PWM waveform pattern.

A PWM waveform pattern may be represented as a Bessel function or as the sum of many phase displaced square waves. Although the present invention is not dependent on the method of the selection of the square waves in the pattern, the preferred method of the invention assumes a quarterwave (90 degrees) symmetry for the square wave in which case only odd harmonics are generated which simplifies DC unbalance, current limiting and power and VAR control.

Based on the foregoing, the PWM Fourier series may be represented by the expression:

$$4/PI(C_1 \sin(Wt) + C_3 \sin(3Wt) + C_5 \sin(5Wt) + \cdots ) \quad (1)$$

The voltage magnitude coefficient can be represented by the following expression:

$$C_N = (1 - 2\cos(N2) + 2\cos(NB) - 2\cos(NC) + \cdots)/N \quad (2)$$

Where N = harmonic number

Therefore, an independent equation for each switch point per quartercycle defining the harmonic voltages can be written. For example, for one switch point with a frequency of 3 times the fundamental, the equation for the voltage magnitude coefficient:

$$MAG = \frac{(1 - 2\cos(\text{angle})(\text{harmonic})}{(\text{harmonic})} \quad (3)$$

The following equation represents two switch points at a frequency of 5 times the fundamental:

$$MAG = \frac{1 - 2\cos(\text{angle1})(\text{harmonic}) + 2\cos(\text{angle2})(\text{harmonic})}{\text{harmonic}} \quad (4)$$

One approach to solve the nonlinear equations defining the harmonics as a function of the PWM patterns is to set the magnitude equal to some value of the fundamental and the magnitude of a harmonic, for example, the fifth harmonic, equal to 0. The result is two equations with two unknown angles which may be solved for by known mathematical procedures such as Newton's or Piccard's methods.

An alternative is to solve only one equation wherein the fifth harmonic is set equal to 0. For this solution, the value of the larger of the two angles is selected resulting in the following equation:

$$\text{angle 1} = \frac{\arccos[0.5 + \cos(\text{angle2})(5)]}{5} \quad (5)$$

The equation (5) can be solved for a range of given values of the angle 2 and the results can then be used to calculate the fundamental voltage. Although the above equation in the foregoing example does not require the solution of simultaneous equations, answers for PWM waveform patterns with more than two switch points requires the solution of simultaneous equations.

For example, the following equations for the fundamental, fifth and seventh harmonic can be written for three switches per quarter cycle:

$$\text{Fundamental} = (1 - 2\cos(A) + 2\cos(B) - 2\cos(C) + \cdots) \quad (6)$$

$$\text{5th harmonic} = \frac{[1 + 2\cos(5A) + \cos(5B) - 2\cos(5C) + \cdots]}{5} \quad (7)$$

$$\text{7th harmonic} = \frac{[1 - 2\cos(7A) + 2\cos(7B) - 2\cos(7C) + \cdots]}{7} \quad (8)$$

By setting the equations (6) (7) and (8) equal to some value, the three angles A, B and C may be found. For example, the fundamental could be set equal to 90% and the fifth and seventh harmonics equal to 0% and the nonlinear equations may be solved to find the value of the three angles if the values exist. It will be apparent that this method may be extended to accommodate a large number of switch points.

According to the present invention, solutions are found for a range of fundamental voltages over which the harmonics are reduced to be within acceptable limits for the inverter design in question. In the first approach to the solution of the nonlinear equations wherein the voltage magnitude is set to some value N equations are solved with the fundamental voltage index defined and N angles are found to reduce N-1 harmonics. In the second approach above wherein the value of the larger of the two angles to be found is selected, N-1 equations are solved for N-1 angles. A range of solutions is found by specifying different value angles. The value of the fundamental may then be calculated.

It has been found that using the second approach yields more consistent results since one angle is fixed. Since non-linear equations have multiple answers, the valid answers tend to group the angles within a 60 degree region. Therefore, maintaining one angle fixed tends to group the solution set in the desired region of valid answers.

Typical restrictions on the solution set are:

a) no reversal of angle positions (yields an incorrect solution).

b) calculated angles lie between specific limits for example, 0.5 to 88.5 degrees.

c) no harmonic above a given specified value.

From a practical standpoint, removal of harmonics not otherwise cancelled results in the available range of modulation indices of the fundamental being very narrow. Applicant has determined that the addition of switch points reduces more harmonics in the range of interest and provides a wider range of modulation indices of the fundamental. The additional switch points requires solving higher orders of equations which increases the computation time and makes it difficult to find the starting values from which to solve the equations.

The solution of the nonlinear simultaneous equations typically is done iteratively wherein initial guesses of the answers are made and are subsequently used to obtain successively better guesses or to determine if there is no solution to the equation. The typical test for a given solution is to compute the magnitudes of the harmonics after the angles are found to determine whether the residual values of the reduced harmonic are below specified maximum value. The method of the present invention departs from prior conventional practice wherein it is attempted to determine and obtain solutions to produce residual values of harmonics below the magnitude of the fundamental by at least 1000 to 1. In one given power inverter, for example, a combination of two three-phase bridges using harmonic reduction and a low pass filter permitted the magnitude of many of the harmonics generated by the bridge to be at relatively high levels, up to 20%, without degrading the output signal.

Figure 2:
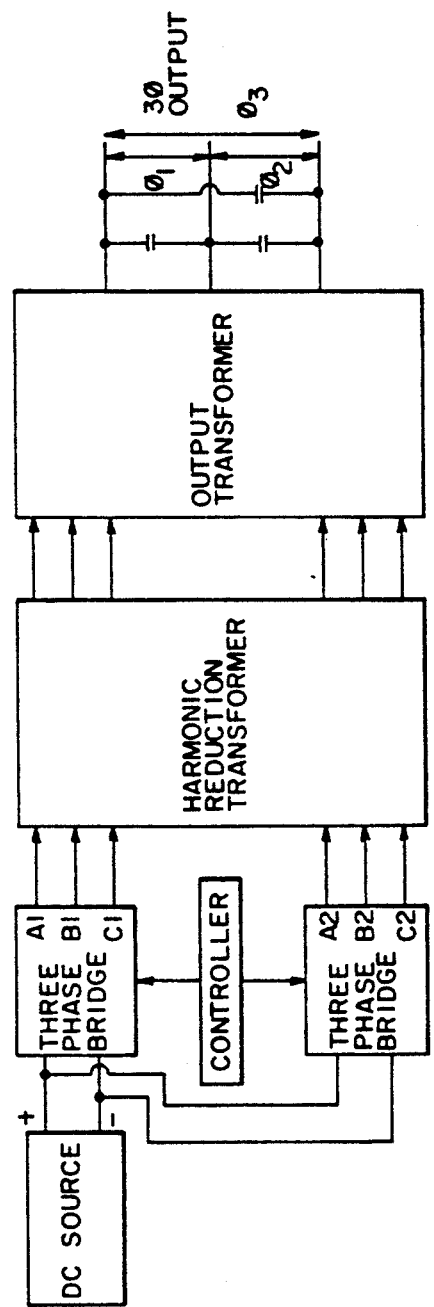
FIG. 2 is a simplified schematic functional block diagram showing a representative three-phase, two-bridge inverter power system with which the method of the present invention may be used.

The method of the present invention as illustrated generally by the flowchart shown in FIG. 1, utilizes a weighting curve which sets the acceptable level of all the harmonics which are reduced by a PWM waveform pattern. The advantage of setting the weighting curve to the solution is that only two of the many harmonics have severe magnitude restrictions. For a two-bridge inverter, such as the one illustrated in FIG. 2, only the 11th and 13th harmonic need to be reduced to as low as 0.3%. Therefore, the method of the invention involves examining the total inverter power system to place a weighting factor on the reduction of the harmonics.

Applicant has developed a controller utilizing the following parameters to obtain a low harmonic output from a two-bridge inverter system having minimal filtering. The parameters are: 1) ½ degree minimum between switch points; 2) 10 switch points per one quarter cycle (21 times fundamental); 3) reduce the 11th and 13th harmonic to less than 0.3% of fundamental; 4) reduce the 23rd and 25th harmonic less than or equal to 2% of fundamental; 5) reduce the 35th and 37th harmonic less than or equal to 5% of the fundamental; 6) reduce 5th, 7th, 17th, 19th, 29th, 31st, 41st, 43rd, 47th, 49th harmonic less than 10% of fundamental; and 7) select the 7th, 11th, 13th, 19th, 23rd, 25th, 31st, 35th, 37th and 41st harmonics for reduction. It should be noted that the 7th, 19th, 31st and 41st harmonics are also reduced by the two-bridge connection. Although it is possible to determine a PWM waveform pattern to reduce only the harmonics not reduced by other means, the available range of modulation indices of the fundamental is extremely narrow. Accordingly, applicant has found that reducing one from each pair of harmonics also reduced by the magnetics of the bridge connection and/or harmonic signal reduction transformers such as disclosed in the above-referenced U.S. Pat. No. 4,975,822 yields good results.

One suitable method to solve the nonlinear simultaneous equations involves utilization of a multivariable expansion of Newton's method of approximation. An examination of a table of values of an equation that has a value of $f(x)=0$, will show that as x changes, the function goes from negative to positive or the reverse between successive steps in x, and over a small range of x, the slope of $Df(x)/Dx$ is constant. Newton's method takes advantage of this fact to obtain a successive better solution to the value of x where $f(x)=0$. When more than one equation is involved, partial derivatives of the equation are used to derive a set of linear simultaneous equations that can be solved to produce a better estimate of the solution.

It will be recognized that the matrix of partial derivatives is known as the Jacobian. This process is initiated by selecting N phase angles to find N-1 angles and one angle, generally the highest angle does not change. The Jacobian is then generated and the values of the harmonics are calculated for each of the selected values. The two matrices, (N-1),N and (N-1), 1 are solved to find delta angle values that would reduce the magnitude of the harmonic values to 0 if the system were linear. The delta's found are added to the previous guess and the harmonics are again calculated. A solution is found when the harmonics are within the desired range. It should be recognized that the solution for the delta angles results in some cases in non-realizable angles, for example, negative angles, angles greater than 90 degrees, angles reversing positions, and angles less than ½ degree apart. In other instances, the computed delta angles are too large. In such instances, a variable lambda called a relaxation factor, is used to produce smaller changes.

For a two-bridge inverter, such as in the example discussed above, three of six harmonics were added to the reduction solution and of the six possible combinations, one provided the best result. These are shown as patterns no. 2 and no. 5 shown in FIGS. 3 and 4, respectively. These solutions cover a sufficiently wide range of modulation indices to be suitable for use.

The PWM waveform patterns are found using a computer program, for example, a Pascal program. In the example presented, the program consists of a main program and several subunits and the program is set to find patterns for three to ten switches per half cycle. The program for finding PWM waveform patterns is presented in Table 1.

TABLE 1

```
(
program patterns; {Finds PWM patterns that have reduced harmonics based on data}
{in program defhara.pas and the number of switch points per quarter cycle}
{One less harmonic is reduced than the number of switch points}
{The reduction is weighted to reduce 11th and 13th harmonics to the lowest}
{level                                                                    }

{A companion program convtosw.pas converts the data output from this program}
{to 8096 assembler source code input format.}
uses
    defhara, simultgj, haravals, jacob, srt_pro;
```

```
type
 itempointers = ^itemrecords;
 itemrecords = record
    angles: array[1..14] of real;
    position: longint;
    next: itempointers;
   end; {record}
var
 afile: string[40];
 tmpfile: string[200];
 outsmain: text;
 a: ary2s;
 x, y: ary;
 coef, theta, theta_in, theta_sc: arys;
 n, m, num, numsc, choice: integer;
 error, error1, error2, error3, solve, another, addpat, difpat, difchoice, auto, preauto, postauto, revauto: boolean;
 lambda, delangle, fund: real;
 decision: char;
procedure write_data (num: integer);
 var
  i: integer;
begin
 for i := 1 to num do
   begin
    write(coef[i] : 12);
    if i mod 5 = 0 then
      writeln(output);
    end;
  writeln(output, ' diffs');
 end;
begin
 writeln(output, 'Enter an initial data file.');
  write(output,' It must be empty or have data from previous runs');
 readln(input, thefile);
 theinfile := concat('a:', thefile,'.dat');
 assign(ins, theinfile);
 reset(ins);
 writeln(output, 'Enter the destination file.');
  write(output,' An existing file will be overwritten.');
 readln(input, theinfile);
 thefile := concat('a:', theinfile,'.dat');
 assign(outs, thefile);
 rewrite(outs);
 difchoice := true;
 repeat
  repeat
   write(output, 'Enter choice of reduction patterns: 1 to ', lastcase : 2, ' ');
```

Pattern Waveforms

```
  readln(input, choice);
 until (choice >= 1) and (choice <= lastcase);
 harm(choice, aharm);
 difpat := true;
 while difpat do
  begin
   error1 := true;
   auto := false;
   preauto := false;
   postauto := false;
   revauto := false;
```

```
repeat
 write(output, 'How many switches? 10 or less');
 readln(input, a);
until (a > 2) and (a < 11);
num := a - 1;
write(output, 'enter ', a : 4, ' angles less than 88 degrees');
for i := 1 to num do
 read(input, theta_in[i]);
readln(input, theta_in[num + 1]);
addpat := true;
while addpat do
 begin
  another := true;
  revauto := false;
  while another do
   begin
    for i := 1 to num + 1 do
     theta[i] := theta_in[i];
    if error1 then
     repeat
      write('relaxation factor and delta angle ?');
      readln(lambda, delangle);
     until (lambda < 2.0) and (lambda > 0.0);
    for i := 1 to num do
     begin
      if i mod 6 = 0 then
       writeln(output);
      write(output, theta[i] : 10 : 2);
     end;
    writeln(output, theta[num + 1] : 10 : 2, ' theta');
    harmval(theta, y, num);
    writeln(output, ' choice ', choice : 3, ' lambda ', lambda : 10 : 5, ' fund ', y[12] : 10 : 5);
    for i := 1 to num - 1 do
     begin
      if i mod 5 = 0 then
       writeln;
      write(output, ahara[i] : 3, ' ', 100.0 * y[i] / y[12] : 10 : 4);
     end;
    writeln(output, ahara[num] : 3, ' ', 100.0 * y[num] / y[12] : 10 : 4);
    writeln;
    repeat
     begin
      jac(theta, a, num);
      gaussj(a, y, coef, num, error, lambda);
      if not error then
       begin
        error1 := false;
        write_data(num);
       end
      else
       error1 := true;
      for i := 1 to num do
       theta[i] := theta[i] - lambda * coef[i];
      solve := true;
      for i := 1 to num do
       begin
```

```
    if i mod 6 = 0 then
      writeln;
    write(output, theta[i] : 10 : 2);
   end;
  writeln(output, theta[num + 1] : 10 : 2, ' theta');
  harmval(theta, y, num);
  writeln(output, 'choice ', choice : 3, ' lambda ', lambda : 10 : 5, ' fund ', y[12] : 10 : 4);
  for i := 1 to num - 1 do
   begin
    if abs(y[i] / y[12]) > limit[i] then
      solve := false;
    if i mod 5 = 0 then
      writeln;
    write(output, ahara[i] : 3, ' ', 100.0 * y[i] / y[12] : 10 : 4);
   end;
  writeln(output, ahara[num] : 3, ' ', 100.0 * y[num] / y[12] : 10 : 4);
  writeln;
  error2 := false;
  for i := 1 to num do
   if (theta[i] > theta[1 + i] - 0.5) or (abs(theta[i]) > 88.0) then
     error2 := true;
   if theta[1] < 0.5 then
     error2 := true;
   writeln;
  end;
 until solve or error1 or error2;
 if not (error1 or error2) then
  fund := y[12];
 if error2 and not error1 then
  begin
   another := false;
   error1 := true;
            if auto and postauto then
               begin
                 write(output,'End of Run. Do another set? yes or no');
                 readln(input,decision);
                 if (decision='y') or (decision='Y') then
                    difchoice:=true
                 else
                    difchoice:=false;
                 difpat:=false;
                 if difchoice then
                    begin
                       write(output,'Same harmonic group? yes or no');
                       readln(input,decision);
                       if (decision='y') or (decision='Y') then
                          difpat:=true
                       else
                          difpat:=false;
                         end;
                       another:=false;
                       addpat:=false;
                  end;
            if auto and not postauto then
               begin
                 delangle := -delangle;
```

```
         num := numsc;
         for i := 1 to num do
          theta_in[i] := theta_sc[i];
         theta_in[num + 1] := theta_sc[num + 1];
         postauto := true;
                    another:=true;
                    error1:=false;
        end;
                 if not auto then
        begin
         writeln(output, 'No solution . Do you wish a fresh set of points, yes or no? ');
                    write(output,' or a different lambda ?lambda    ');
         readln(input, decision);
         if (decision = 'n') or (decision = 'N') then
          begin
           difpat := false;
           write(output, 'Different harmonic factors ? yes or no   ');
           readln(input, decision);
           if (decision = 'n') or (decision = 'N') then
            difchoice := false;
          end;
          addpat := false;
          if (decision = 'l') or (decision = 'L') then
           begin
            another := true;
            addpat := true;
           end;
         end;
        end
       else if error1 then
        begin
         write(output, 'try a smaller lambda?');
         readln(input, decision);
         if (decision = 'y') or (decision='Y')  then
           another := true else
           another := false;
         end;
        if (not error1) and (not error2) then
         begin
                 if error1 or error2 then
                    writeln(output,'there is a problem in coding present');
          write(outs, choice, ' ', num + 1, '    ', y[12] : 10 : 5);
          for i := 1 to num do
           write(outs, theta[i] : 10 : 3);
          writeln(outs, theta[num + 1] : 10 : 3);
          if (not auto) or ((abs(fund) < 0.5) and postauto) then
           begin
            writeln(output, 'Do you want another pattern? Yes  different pattern?More ');
                    write(output,' end? No or auto seq ? Auto    ');
            readln(input, decision);
                 end;
          if (decision = 'a') or (decision = 'A') and not auto then
                    begin
            auto := true;
```

```
                numsec := num;
                for i := 1 to num do
                  theta_sc[i] := theta[i];
                theta_sc[num + 1] := theta[num + 1] + delangle;
            end;
          if (decision = 'y') or (decision = 'Y') or auto then
            begin
                    if preauto then
              case n of
                3..5:
                  lambda := 1.0;
                6, 7:
                  lambda := 0.4;
                8..11:
                  lambda := 0.1;
              end;
                      preauto:=true;
              for i := 1 to num do
                theta_in[i] := theta[i];
              theta_in[num + 1] := theta[num + 1] - delangle;
                      end;
            if (decision = 'n') or (decision = 'N') then
              begin
                addpat := false;
                difpat := false;
                another := false;
                write(output, 'Different harmonic factors ? yes or no   ');
                readln(input, decision);
                if (decision = 'n') or (decision = 'N') then
                  difchoice := false;
              end;
            if (decision = 'a') or (decision = 'M') then
              begin
                another := false;
                addpat := false;
                        end;
                      end;
                    decision:='o';
        end;
      end;
    end;
  until not difchoice;
  while not eof(ins) do
    begin
      readln(ins, tmpfile);
      writeln(outs, tmpfile);
    end;
  close(ins);
  close(outs);
  sorting;
  close(ins);
  close(outs);
end.
unit defhara;
interface
  type
```

```
    ah = array[1..12] of integer;
    angles = array[1..12] of real;
const
    rad = 1.745329e-2;
    pi = 3.1415924;
    lastcase = 7;
var
    ahara: ah;
    limit: angles;
procedure hara (group: integer; var h: ah);
implementation
 procedure hara;
    var
        i, j: integer;
    begin
      case group of
        1:
          begin
            h[1] := 5;
            h[2] := 7;
            h[3] := 11;
            h[4] := 13;
            h[5] := 17;
            h[6] := 19;
            h[7] := 23;
            h[8] := 25;
            h[9] := 29;
            h[10] := 31;
            h[12] := 1;
          end;
        2:
          begin
            h[1] := 5;
            h[2] := 11;
            h[3] := 13;
            h[4] := 17;
            h[5] := 23;
            h[6] := 25;
            h[7] := 29;
            h[8] := 35;
            h[9] := 37;
            h[10] := 41;
            h[12] := 1;
          end;
        3:
          begin
            h[1] := 7;
            h[2] := 11;
            h[3] := 13;
            h[4] := 23;
            h[5] := 25;
            h[6] := 31;
            h[7] := 35;
            h[8] := 37;
            h[9] := 41;
            h[10] := 43;
            h[12] := 1;
```

```
    end;
4:
  begin
    h[1] := 7;
    h[2] := 11;
    h[3] := 13;
    h[4] := 19;
    h[5] := 23;
    h[6] := 25;
    h[7] := 29;
    h[8] := 35;
    h[9] := 37;
    h[10] := 43;
    h[12] := 1;
  end;
5:
  begin
    h[1] := 7;
    h[2] := 11;
    h[3] := 13;
    h[4] := 19;
    h[5] := 23;
    h[6] := 25;
    h[7] := 31;
    h[8] := 35;
    h[9] := 37;
    h[10] := 41;
    h[12] := 1;
  end;
6:
  begin
    h[1] := 7;
    h[2] := 11;
    h[3] := 13;
    h[4] := 17;
    h[5] := 23;
    h[6] := 25;
    h[7] := 31;
    h[8] := 35;
    h[9] := 37;
    h[10] := 41;
    h[12] := 1;
  end;
lastcase:
  begin
    h[1] := 5;
    h[2] := 7;
    h[3] := 11;
    h[4] := 13;
    h[5] := 17;
    h[6] := 23;
    h[7] := 25;
    h[8] := 35;
    h[9] := 37;
    h[10] := 41;
    h[12] := 1;
  end;
```

```
          else
            begin
              h[1] := 5;
              h[2] := 7;
              h[3] := 11;
              h[4] := 13;
              h[5] := 17;
              h[6] := 19;
              h[7] := 23;
              h[8] := 25;
              h[9] := 29;
              h[10] := 31;
              h[12] := 1;
            end;
        end;
        for i := 1 to 12 do
          begin
            case h[i] of
              5, 7, 17, 19, 29, 31, 41, 43, 47, 49:
                limit[i] := 0.1;
              11, 13:
                limit[i] := 0.003;
              23, 25:
                limit[i] := 0.02;
              35, 37:
                limit[i] := 0.05;
              1:
                limit[i] := 1.0;
            end;
          end;
    end;
end.
unit simultgj;
interface
  const
    maxr = 12;
    maxc = 12;
  type
    ary = array[1..maxr] of extended;
    arys = array[1..maxc] of extended;
    ary2s = array[1..maxr, 1..maxc] of extended;

procedure gaussj (b: ary2s;
                    y: ary;
                    var coef: arys;
                    ncol: integer;
                    var error: boolean;
                    lambda: real);

implementation
  procedure gaussj;
    var
      w: array[1..maxc, 1..maxc] of extended;
      i, j, k, l, nv, irow, icol, N, L1: integer;
      determ, pivot, hold, sum, t, ab, big: extended;
      diff: ary;
```

```
      index: array[1..maxc, 1..3] of integer;
   procedure swap (var a, b: extended);
      var
         hold: extended;
      begin
         hold := a;
         a := b;
         b := hold;
      end;
begin
   error := false;
   nv := 1;
   n := ncol;
   for i := 1 to n do
      begin
         w[i, 1] := y[i];
         index[i, 3] := 0;
      end;
   detera := 1.0;
   for i := 1 to n do
      begin
         big := 0.0;
         for j := 1 to n do
            begin
               if index[j, 3] <> 1 then
                  begin
                     for k := 1 to n do
                        begin
                           if index[k, 3] > 1 then
                              begin
                                 writeln('error:matrix singular');
                                 error := true;
                                 exit;
                              end;
                           if index[k, 3] < 1 then
                              if abs(b[j, k]) > big then
                           begin
                              irow := j;
                              icol := k;
                              big := abs(b[j, k]);
                           end;
                        end;
                  end;
            end;
         index[icol, 3] := index[icol, 3] + 1;
         index[i, 1] := irow;
         index[i, 2] := icol;
         if irow <> icol then
            begin
               detera := -detera;
               for l := 1 to n do
                  swap(b[irow, l], b[icol, l]);
               if nv > 0 then
                  for l := 1 to nv do
                     swap(w[irow, l], w[icol, l]);
```

```
        end;
      pivot := b[icol, icol];
      detera := detera * pivot;
      b[icol, icol] := 1.0;
      for l := 1 to n do
        b[icol, l] := b[icol, l] / pivot;
      if nv > 0 then
        for l := 1 to nv do
          w[icol, l] := w[icol, l] / pivot;
      for ll := 1 to n do
        begin
          if ll <> icol then
            begin
              t := b[ll, icol];
              b[ll, icol] := 0.0;
              for l := 1 to n do
                b[ll, l] := b[ll, l] - b[icol, l] * t;
              if nv > 0 then
                for l := 1 to nv do
                  w[ll, l] := w[ll, l] - w[icol, l] * t;
            end;
        end;
    end;
for i := 1 to n do
  begin
    l := n - i + 1;
    if index[l, 1] <> index[l, 2] then
      begin
        irow := index[l, 1];
        icol := index[l, 2];
        for k := 1 to n do
          swap(b[k, irow], b[k, icol]);
      end;
  end;
for k := 1 to n do
  if index[k, 3] <> 1 then
    begin
      writeln('error:matrix singular');
      error := true;
      exit;
    end;
  for i := 1 to n do
    coef[i] := w[i, 1];
  end;
end.

unit harmvals;

interface
  uses
    defhara, simultgj;
  procedure harmval (theta: arys; var sum: ary; num: integer);
implementation
  procedure harmval;
    var
      k1, l1, m1, n1: integer;
```

```
begin
  for k1 := 1 to num do
    begin
      sum[k1] := 1.0 / ahara[k1];
      if k1 = 1 then
        sum[12] := 1.0;
    end;
  for l1 := 1 to num do
    begin
      a1 := -2;
      for n1 := 1 to num + 1 do
        begin
          sum[l1] := sum[l1] + a1 * cos(rad * theta[n1] * ahara[l1]) / ahara[l1];
          if l1 = 1 then
            sum[12] := sum[12] + a1 * cos(rad * theta[n1] * ahara[12]) / ahara[12];
          a1 := -a1;
        end;
    end;
  end;
end.
unit jacob;
interface
  uses
    defhara, simultgj, haravals;

procedure jac (theta: arys;
                 var a: ary2s;
                 num: integer);
implementation
  procedure jac;
    var
      i2, j2, l2, a2: integer;
    begin
      for i2 := 1 to num do
        begin
          a2 := 1;
          for j2 := 1 to num do
            begin
              a[i2, j2] := a2 * rad * sin(ahara[i2] * theta[j2] * rad);
              a2 := -a2;
            end;
        end;
    end;
end.
unit srt_pro;
interface
  uses
    simultgj;
  type
    itempointer = ^linerec;
    linerec = record
        choice, num: integer;
        y: ary;
        next: itempointer;
      end;
    str = string[40];
```

```
var
   listhdr: itempointer;
   newitem: ary;
   ins, outs, scratch: text;
   i, j, k, l, seq: integer;
   thefile, theinfile: string[40];

procedure sorting;
implementation procedure itemrd (seq: integer;
                     var num, choice: integer;
                     var x: ary);
     var
        k1: integer;
     begin
        read(ins, choice, num);
        for k1 := 1 to num do
           read(ins, x[k1]);
        readln(ins, x[num + 1]);
     end;
   procedure itemins (seq, numsw, choicesw: integer;
                      itmnew: ary);
     var
        entry, priorentry, newentry: itempointer;
        search: boolean;
     begin
        entry := listhdr;
        search := true;
        while search and (entry <> nil) do
           with entry^ do
              if seq = 1 then
                 begin
                    if (choicesw <= choice) then
                       search := false
                    else
                       begin
                          priorentry := entry;
                          entry := next;
                       end;
                 end
              else if seq = 2 then
                 begin
                    if (choicesw <= choice) and (numsw <= num) then
                       search := false
                    else
                       begin 2
                          priorentry := entry;
                          entry := next;
                       end;
                 end
              else if seq = 3 then
                 begin
                    if (abs(itmnew[1]) < abs(y[1])) and (numsw <= num) and (choicesw <= choice) then
                       search := false
```

```
              else
                begin
                  priorentry := entry;
                  entry := next;
                end;
            end;
      new(newentry);
      newentry^.choice := choicew;
      newentry^.num := numw;
      newentry^.y := itmnew;
      newentry^.next := entry;
      if entry = listhdr then
        listhdr := newentry
      else
        priorentry^.next := newentry;
    end;
  procedure itemrt (q: integer);
    var
      entry: itempointer;
      w: integer;
      filling: text;
    begin
      entry := listhdr;
      while entry <> nil do
        with entry^ do
          begin
            if q = 1 then
              begin
                write(scratch, choice, ' ', num, ' ', y[1] : 10 : 5, ' ');
                for w := 2 to num do
                  write(scratch, y[w] : 10 : 3);
                writeln(scratch, y[num + 1] : 10 : 3);
                entry := next;
              end
            else
              begin
                write(outs, choice : 4, ' ', num : 4, ' ', y[1] : 10 : 5, ' ');
                for w := 2 to num do
                  write(outs, y[w] : 10 : 3);
                writeln(outs, y[num + 1] : 10 : 3);
                entry := next;
              end;
          end;
    end;
  procedure sorting;
    var
      choice: integer;
      templine: string[200];
    begin
      assign(scratch, 'SCRATCH');
      rewrite(scratch);
      assign(ins, thefile);
      reset(ins);
      listhdr := nil;
      seq := 1;
```

```
   while not eof(ins) do
     begin
        iterd(seq, i, choice, newitem);
        itemins(seq, i, choice, newitem);
     end;
   itsrt(1);
   close(scratch);
   close(ins);
   assign(outs,thefile);
   rewrite(outs);
   assign(ins,'scratch');
   reset(ins);
   seq := 2;
   listhdr := nil;
   while not eof(ins) do
     begin
        iterd(seq, i, choice, newitem);
        itemins(seq, i, choice, newitem);
     end;
   itsrt(2);
   close(ins);
   close(outs);
   assign(scratch,'scratch');
   rewrite(scratch);
   assign(ins,thefile);
   reset(ins);
   while not eof(ins) do
     begin
        readln(ins, tempine);
        writeln(scratch, tempine);
     end;
   close(ins);
   close(scratch);
   assign(outs,thefile);
   rewrite(outs);
   assign(ins,'scratch');
   reset(ins);
   seq := 3;
   listhdr := nil;
   while not eof(ins) do
     begin
        iterd(seq, i, choice, newitem);
        itemins(seq, i, choice, newitem);
     end;
    itsrt(2);
  end;
end.
```

Once the PWM waveform switch points have been determined, the patterns are converted to an information format usable by the controller in the power inverter system. Typically, a microprocessor follows an instruction set to carry out the necessary controller operations which are generally well understood by those skilled in the art. A computer program for converting the switch point information to a form that a microprocessor assembly source code uses to define PWM waveform drive patterns is shown in Table 2.

TABLE 2

```
program convert_to_asm;
()
{This program is used to process data obtained from the PATTERNS program that produces harmonically}
{reduced PWM waves with substantial reductions through the 37th with 10 switch points per half cycle. }
{As a first step, the angles are converted to integer counts of the microcontroller clock, 6048 per cycle}
{The three tables needed for the 8096 program are produced as ASCII files.}
{Wave data in the form of comments are included in the PWM.asm file.} type
    hnums = array[1..30] of integer;
    hvals = array[1..30] of real;
  var
    i, j, k, n, ni, nh, choice, number: integer;
    hares, per_div: hnums;
    angle, wave: hvals;
    ins, pwm, pwmtable, pwmfuntab: text;
    theinfile: string[40];
    fund, ratio: real;
{The following procedure calculates significant harmonics, no triplens, through the 61st.}
{Input is number of switches, angles, and the harmonic table. Edge notch formula derivitive.}
    procedure haraval (theta: hvals; num: integer; ahars: hnums; var sum: hvals);
      const
        rad = 0.01745329;
      var
        k1, l1, s1, n1: integer;
      begin
        for k1 := 1 to 21 do
          begin
            sum[k1] := 1.0 / ahars[k1];
          end;
        for l1 := 1 to 21 do
          begin
            s1 := -2;
            for n1 := 1 to num do
              begin
                sum[l1] := sum[l1] + s1 * cos(rad * theta[n1] * ahars[l1]) / ahars[l1];
                s1 := -s1;
              end;
          end;
      end;
    end;
begin
  assign(pwm, 'b:PWM.ASM');{Set up files.}
  rewrite(pwm);
  assign(pwmtable, 'b:TABLE.ASM');
  rewrite(pwmtable);
  assign(pwmfuntab, 'b:FUNTAB.ASM');
  rewrite(pwmfuntab);
  writeln(pwmtable, ' ');
  writeln(pwmtable, 'TIME_TABLE:');
  writeln(pwmfuntab, ' ');
  writeln(pwmfuntab, 'FUNTAB:');
  ratio := 6048.0 / 360.0;
  hares[1] := 1;
  for j := 1 to 10 do{Calculate harmonic numbers through the 61st.}
    begin
```

```
        n := 6 + j;
        for k := 1 to 2 do
          begin
            ni := -3 + 2 * k;
            nh := n + ni;
                 2
            harms[2 * j - 1 + k] := nh;
          end;
      end;
    write(output, 'Enter data file without drive and extensions ');
    readln(input, theinfile);{Source file and program on A drive, end files on B drive.}
    assign(ins, concat('a:', theinfile, '.dat'));
    reset(ins);
    repeat
      read(ins, choice, number, fund);
      for i := 1 to number - 1 do
        read(ins, angle[i]);
      readln(ins, angle[number]);
      for i := 1 to number do
        begin
          per_div[i] := round(angle[i] * ratio);{Convert angles to descrete steps and angles.}
          angle[i] := per_div[i] / ratio;
        end;
    {Start output. Semicolons start comments .}
      writeln(pwm, '$EJECT');
      writeln(pwm, ';;');
      writeln(pwm, ';;');
      write(pwm, ';;    ');
      for i := 1 to number - 1 do{Start angle and magnitude of harmonics written.}
        begin
          write(pwm, angle[i] : 8 : 3);
          if i mod 5 = 0 then
            begin
              writeln(pwm, ';;   ');
              write(pwm, ';;   ');
            end;
        end;
      writeln(pwm, angle[number] : 8 : 3);
      writeln(pwm, ';;   ');
      write(pwm, ';;   ');
      harmval(angle, number, harms, wave);{Calculate harmonics.}
      for i := 1 to 20 do
        begin
          write(pwm, harms[i] : 2, ' ', wave[i] : 9 : 5, ' ');{Harmonic and magnitude.}
          if i mod 5 = 0 then
            begin
              writeln(pwm, ';;   ');
              write(pwm, ';;   ');
            end;
        end;
      writeln(pwm, harms[21] : 2, ' ', wave[21] : 9 : 5);{End harmonic display in file PWM.ASM.}
      writeln(pwm, ';;');
      Write(pwmtable, '    DCW PWM', (wave[1] * 10000) : 4 : 0);{Begin output of working values.}
      Writeln(pwmtable, '       ; address of PWM pattern');
      Writeln(pwmfuntab, '    DCW ', (wave[1] * 10000) : 4 : 0);
      Writeln(pwm, ' ');
      Write(pwm, 'PWM', (wave[1] * 10000) : 4 : 0, ';');
```

```
Writeln(output, 'PWM', (wave[1] * 10000) : 4 : 0, ':');
Writeln(pwm, '            ; PWM pattern starts here');
j := 1;
for i := number downto 1 do{Output switchpoints for 180 degree interval.}
  begin
    Write(pwm, '           DCM', (1512 - per_div[i]) : 6);
    Writeln(pwm, '; switchpoint # ', j : 2, ' : ', -angle[i] : 7 : 3, ' degrees');
    j := j + 1;
  end;
    3
    Write(pwm, '           DCM', 1512 : 6);
    Writeln(pwm, '; switchpoint # ', j : 2, ' :   0.000 degrees');
    j := j + 1;
  for i := 1 to number do
    begin
      Write(pwm, '           DCM', (1512 + per_div[i]) : 6);
      Writeln(pwm, '; switchpoint # ', j : 2, ' : ', angle[i] : 7 : 3, ' degrees');
      j := j + 1;
    end;
    Write(pwm, '           DCM', 3024 : 6);
    Writeln(pwm, '; End of pattern');
until eof(ins);
Writeln(pwm, '; End of file ;');
Writeln(pwmtable, '; End of file ;');
Writeln(pwmfuntab, '; End of file ;');
close(pwm);
close(pwmtable);
close(pwmfuntab);{Thats it.}
end.
```

A method for specifying a group of PWM waveform patterns to reduce only those harmonics necessary to satisfy a given power inverter design has been disclosed above in several embodiments. It will be recognized that the implementation of the method may be varied without departing from the spirit and scope of the invention and therefore the invention has been disclosed by example rather than limitation.

The invention claimed is:

1. Process for defining a PWM waveform pattern to control at least one switching bridge in a power inverter system to produce a low harmonic content output voltage signal wherein the PWM waveform pattern has at least one switching point, said process comprising the steps of:
   specifying a desired harmonic signal content in a voltage output for the inverter system for each of the harmonics produced thereby;
   defining a pulse switching rate for the switching bridge in the power inverter system;
   assigning a weighting factor to each harmonic produced by the switching bridge in the power inverter system;
   identifying each harmonic reduced by the power inverter system;
   selecting harmonics, other than those reduced by the power inverter system, to be reduced;
   representing the selected harmonics to be reduced one-for-one by a corresponding set of equations;
   solving the set of equations to fine each of the switch points in the PWM waveform pattern, and
   operating the switching bridge in accordance with the switch points determined for the PWM waveform pattern to produce the output voltage signal.

2. Process for defining a PWM waveform pattern as set forth in claim 1 further including the steps of:
   calculating the magnitude of the fundamental voltage signal for the PWM waveform pattern;
   calculating the magnitude of each of the harmonics produced, and
   comparing the magnitude of each of the harmonics produced in the output voltage signal to the corresponding assigned weighting factor to determine if the magnitude is less than the specified desired harmonic signal content;
   adjusting the magnitude of an assigned weighting factor for each harmonic identified having a magnitude greater than the specified desired harmonic signal content;
   comparing the magnitude of each of the harmonics produced in the output voltage signal to the corresponding adjusted assigned weighting factor to determine if the magnitude is less than the specified desired harmonic signal content, and
   repeating the steps of adjusting the magnitude of an assigned weighting factor and comparing the magnitude of the harmonics produced to achieve an output voltage signal having the desired harmonic content.

3. Process for defining a PWM waveform pattern to control a power inverter system to produce a low harmonic content output voltage signal wherein the PWM waveform pattern has at least one switching point, said process comprising the steps of:
- specifying a desired total harmonic signal content in a voltage output for the power inverter system;
- defining a pulse switching rate for the power inverter system;
- assigning a weighting factor to each of the harmonics produced by the power inverter system;
- selecting the harmonics to be reduced;
- representing the selected harmonics to be reduced by a corresponding set of equations;
- fixing the value of at least one switching point in the set of N equations;
- solving the N-1 equations for N-1 different switching points;
- calculating the magnitude of the fundamental voltage using the value of the N-1 switching points and at least one fixed switching point, and
- operating the power inverter system in accordance with said fixed switching point and the N-1 switching points determined for the PWM waveform pattern to produce the output voltage signal.

4. Process for defining PWM waveform pattern as set forth in claim 3 further including the step of comparing the magnitude of each harmonic generated to the corresponding assigned weighting factor to determine if the resultant harmonic magnitude is within the specified value; adjusting the value of the N-1 switching points when the resultant harmonic magnitude is greater than the specified desired harmonic signal content;
calculating the magnitude of the fundamental voltage using the adjusted value of the N-1 switching points and the fixed switching points, and
comparing the magnitude of each of the harmonics produced in the output voltage signal to the corresponding assigned weighting factor to determine if the magnitude is less than the specified desired harmonic signal content, and repeating the steps of adjusting, calculating and comparing to achieve an output voltage signal having the desired harmonic content.

* * * * *

UNITED STATES PATENT AND TRADEMARK OFFICE
CERTIFICATE OF CORRECTION

PATENT NO. : 5,224,028

DATED : June 29, 1993

INVENTOR(S) : Kenneth Lipman

It is certified that error appears in the above-identified patent and that said Letters Patent is hereby corrected as shown below:

COLUMN 39

Line 66, please delete "fine" and substitute-- find--.

Signed and Sealed this

Twenty-second Day of February, 1994

Attest:

BRUCE LEHMAN

*Attesting Officer*       *Commissioner of Patents and Trademarks*